US005348047A

United States Patent [19]

Stoll et al.

[11] Patent Number: 5,348,047

[45] Date of Patent: Sep. 20, 1994

[54] VALVE ARRANGEMENT

[75] Inventors: Kurt Stoll, Esslingen; Stefan Demuth, Benningen; Magnus Henzler, Grossbettlingen, all of Fed. Rep. of Germany

[73] Assignee: Festo KG, Esslingen, Fed. Rep. of Germany

[21] Appl. No.: 80,753

[22] Filed: Jun. 22, 1993

[30] Foreign Application Priority Data

Jul. 10, 1992 [DE] Fed. Rep. of Germany ....... 4222637

[51] Int. Cl.[5] ........................ F16K 37/00; F16K 31/11

[52] U.S. Cl. .................................... 137/554; 137/560; 137/884; 251/129.03

[58] Field of Search ............... 137/269, 554, 560, 884; 251/129.03

[56] References Cited

U.S. PATENT DOCUMENTS 4,726,393 2/1988 Herner ................................ 137/269
4,815,496 3/1989 Nishitani et al. ............... 137/560 X
4,896,700 1/1990 Stoll .................................... 137/884
4,938,258 7/1990 Sato ..................................... 137/560
4,982,734 1/1991 Green et al. ..................... 137/884 X
5,048,569 9/1991 Stoll et al. ........................ 137/884 X
5,184,648 2/1993 Walter et al. ........................ 137/884
5,234,033 8/1993 Stoll et al. ........................... 137/884

FOREIGN PATENT DOCUMENTS 3927637 3/1990 Fed. Rep. of Germany ...... 137/884
3910913 10/1990 Fed. Rep. of Germany .
0104876 6/1985 Japan .................................. 137/884
0143284 7/1985 Japan .................................. 137/884
61-126163 8/1986 Japan .
0163579 6/1990 Japan .................................. 137/884
0144178 6/1991 Japan .................................. 137/884
0144179 6/1991 Japan .................................. 137/884

*Primary Examiner*—John Rivell
*Attorney, Agent, or Firm*—Flynn, Thiel, Boutell & Tanis

[57] ABSTRACT

A valve arrangement comprising a fluid distributor and a signal distributor arranged adjacent to the same. On the fluid distributor a main valve with a control unit is mounted. The signal distributor has a set of upwardly directed plug connectors. Furthermore there is a set of upwardly directed plug connectors on the control unit, which set is however at a higher level than the that of the signal distributor. In order to produce an electrical connection between the control unit and the signal distributor there is an electrical connection bridge, which comprises internal electrical conductors, which connect together two further sets of electrical plug connectors. Since these sets of plug connectors are directed downwards the connection bridge may be plugged in position from above without any difficulty, respectively associated sets of plug connectors entering into a plugged connection with one another. The result is then a valve arrangement in which the electrical connection part may be very quickly replaced without other valve arrangements being affected thereby.

19 Claims, 2 Drawing Sheets

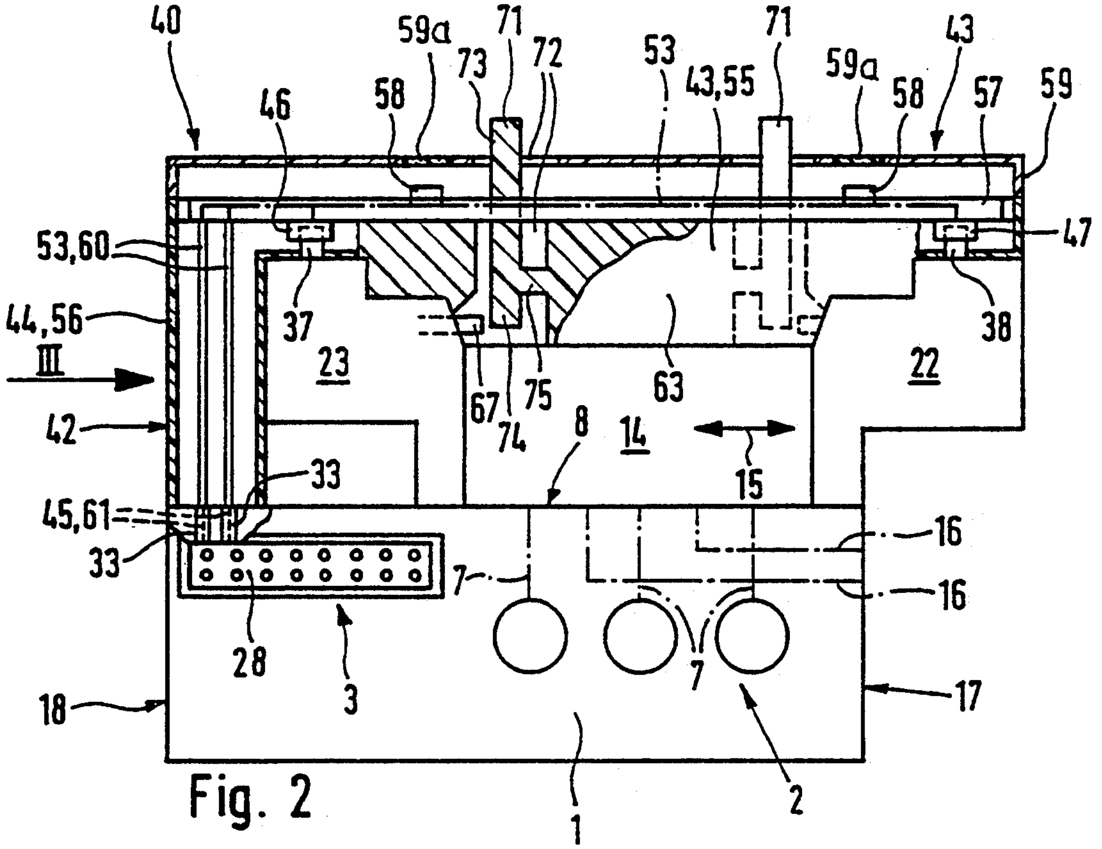
Fig. 2
Fig. 3
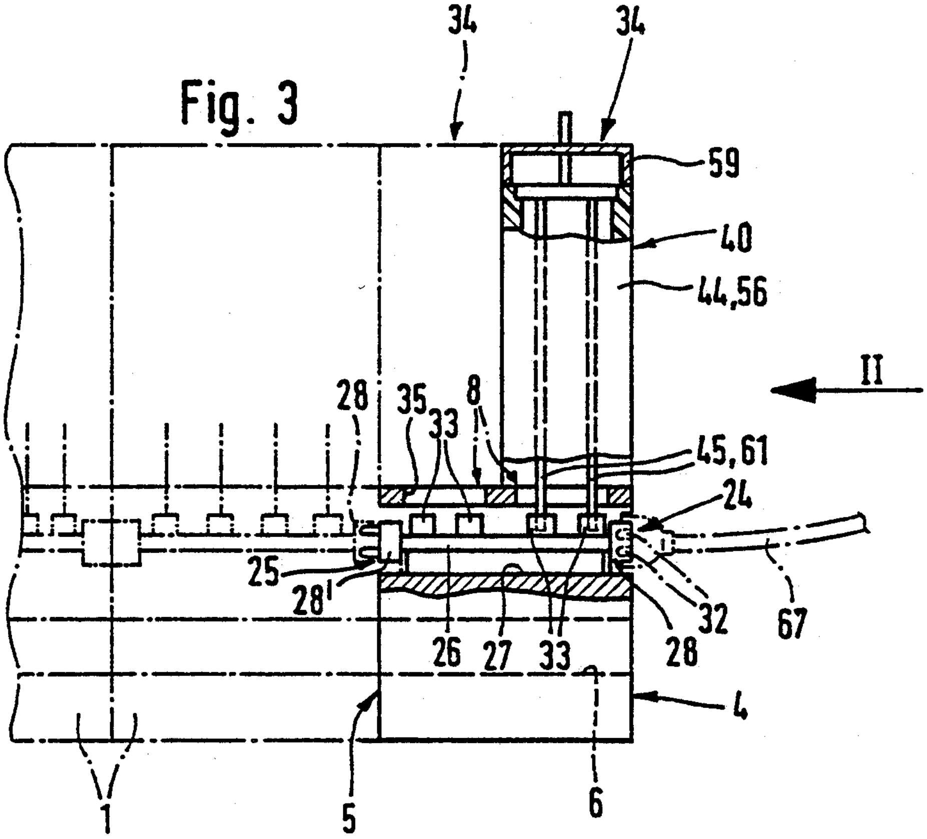

VALVE ARRANGEMENT

BACKGROUND OF THE INVENTION

The invention relates to a valve arrangement comprising a fluid distributor and a signal distributor arranged adjacent to it for electrical signals, at least one main valve arranged on a component mounting area of the fluid distributor and which is in communication with the fluid ducts of the fluid distributor, and at least one electrically operated control unit arranged adjacent to the main valve, said control unit having a first set of electrical plug connectors, which is in electrical connection with an upwardly directed second set of electrical plug connectors of the signal distributor by the intermediary of an intermediate part, the intermediate part having third and fourth sets of electrical plug connectors which are in connection with each other.

Valve arrangement of this type are employed more particularly in the pneumatics field in connection with the control of different types of machines. The arrangement described in German patent publication 3,910,913 A2 has a fluid distributor with an integrated signal distributor, there being a plate-like intermediate part between the fluid distributor and the main valve. In the case of the main valve it is a generally question of multiway valve, whose condition of switching is determined by a flange-mounted control unit which is normally constituted by a pilot valve in the form of a solenoid valve. Via sets of electrical plug connectors the intermediate part is connected on the one hand with the control unit and on the other hand with the signal distributor in order to be able to pass on the necessary control signals from a central unit.

Although the known valve arrangement is relatively compact in construction and is extremely reliable in its functions, some features thereof appear to be in need of improvement. For instance for removal and replacement of the intermediate part it is necessary as a preliminary to remove both the main valve as well as the control units present, something entailing a temporary putting out of operation of the entire valve arrangement. Furthermore disassembly of any failed control unit may only readily be performed on simultaneously removing the main valve. A further point to be considered is that the intermediate part causes special sealing problems, since fluid flows through it. The openings necessary for this furthermore give rise to a drastic reduction of the surface area possibly necessary for electrical and electronic circuitry possibly required for the device.

SHORT SUMMARY OF THE INVENTION

Therefore one object of the present invention to provide a valve arrangement of the type initially mentioned so improved that the arrangement is generally more readily assembled.

A still further object of the invention is to make it unnecessary for the arrangement to be put out of operation for removal and replacement of the intermediate part.

Still further objects of the invention are to mitigate sealing problems and to provide sufficient space for any additional electrical circuits required.

In order to attain these and/or other objects, in the present invention the control unit is so aligned that the first set of electrical plug connectors provided on it is directed away upwards from the signal distributor and is at a higher level than the second set of electrical plug connectors of the signal distributor and in that the intermediate part is designed in the form of a connection bridge having at least in part the configuration of a letter L, the first L-limb extending over the control unit and by means of its third set, which is arranged on it and is directed downwards, of plug connectors is in plugged connection with the first set of plug connectors of the control unit and the second L-limb on the control unit extends past the control unit downwards towards the signal distributor and by means of the fourth set, which is arranged on it and also extends downwards, of plug connectors is pluggedly connected with the second set of plug connectors, which is arranged clear of the component mounting area of the fluid distributor, of the signal distributor.

It is in this manner that the main valve can be mounted directly on the fluid distributor without there being a necessity for an intermediate part extending therebetween. The number of seals is consequently substantially reduced. The connecting bridge may be simply placed in position or removed from above without the associated main valve and the control units cooperating with it having to be removed from the fluid distributor. The result is therefore a very simply serviced structure, which in the case of failure renders possible rapid replacement of any defective connecting bridge without interruption of operation. The connection bridge itself offers sufficient space for the incorporation of any desired circuits or indicating means. While possessing all these advantages there is also a very compact arrangement.

Further advantageous forms of the invention are recited in the claims.

It is convenient if the arrangement is such that the first L-limb extending over the control unit, is aligned with the longitudinal direction of the main valve and the latter preferably is overlapped by it along at least a section of its length as well Without increasing the overall width there is consequently sufficient space over the respective control unit or, respectively, the main valve in order to accommodate electrical or electronic circuitry or furthermore indicating means.

In the case of main valves which only require a single electrically operated control unit—as for example in the case of two-position multiway valves, whose resetting is caused by a spring arrangement—the control unit may be advantageously so arranged that it is adjacent to the end surface facing the signal distributor. It is in this manner that the electrical leads of the connecting bridge may be kept very short. If however two control units are provided for one main valve the second control unit will normally be arranged on the end surface facing away from the signal distributor. The alignment of the second control unit is however preferably the same as that of the first control unit so that the fifth set of electrical plug connectors borne by it is also directed upwards, the first L-limb simultaneously extending over both control unit and being connected by means of an electrical plug connector with the said fifth set of plug connectors of the second control unit, it furthermore being in communication via electrical leads of the connection bridge with the fourth set of plug connectors of the downwardly extending L-limb, which is in plugged connection with the signal distributor. The first L-limb extends in this respect preferably over at least approximately the entire length constituted by the two control units and the main valve.

In order to ensure that the electrical leads of the connecting bridge are protected against damage and against contamination the connection bridge preferably has a housing, which receives the respective electrical leads. Such leads are therefore screened off from the outside. In this respect it is a particular advantage if the electrical leads are at least partly a component of a printed circuit board more particularly in cases in which the printed circuit board bears a sensitive electrical or electronic circuit. In this case it is possible to attain a complete encapsulation of the sensitive components so that it is even possible to comply with the German DIN 40050 standard for sealing off water and dust, something that may be considered equivalent to the so-called protective system IP 65.

The housing of the connecting bridge is furthermore suitable for the attachment of an actuating lever of an auxiliary, hand operated device of the respective control unit.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 2 shows the valve arrangement in accordance with FIG. 1 from the front looking in the direction as indicated by the arrows II of FIGS. 1 and 3 partly broken away.

FIG. 3 is a side elevation of an example of a valve arrangement as seen in the direction as indicated by the arrows III of FIGS. 1, and 2 also partly broken away, the possibility of the mounting of larger units being depicted, which are made up of detachably assembled single elements of the type illustrated in FIG. 1.

DETAILED ACCOUNT OF WORKING EMBODIMENTS OF THE INVENTION

Figure 1:
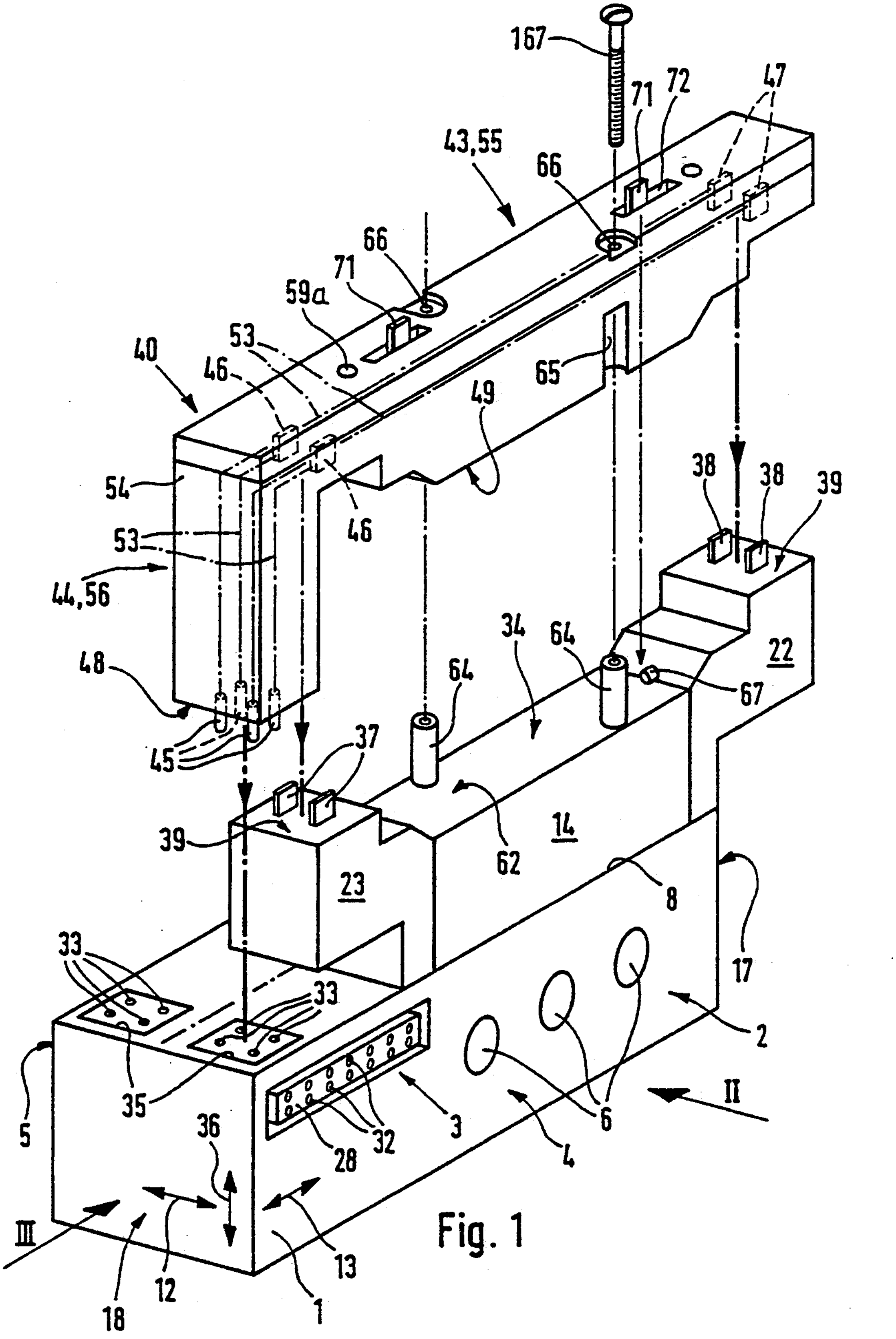
FIG. 1 shows a preferred design of the valve arrangement in a perspective elevation, the connecting bridge being depicted in an upwardly exploded view.

The valve arrangement depicted in FIG. 1 comprises first a rectangular fluid distributor block 1, in which a fluid distributor 2 and a signal distributor 3 arranged to the side thereof for electrical signals are integrated. The fluid distributor 2 comprises a plurality of fluid ducts 6 extending from the front side 4 to the rear side 5 of which in the working embodiment three are provided, of which one serves for the supply and two serve for the removal of a fluid, which will normally be compressed air. From each fluid duct 6 there extend branch ducts 7 which open at the top side of the distributor block 1 into a component mounting area 8. The distributor block 1 taken as an example has two such mounting areas 8 which in the line of extent of the fluid ducts 6 run alongside each other and for which there opens a corresponding set of the above mentioned branch ducts 7. The distributor block 1 may furthermore have only one or more than two component mounting areas 8.

For the following description the direction of extent of the fluid ducts 6, that is to say the direction from the front side 4 to the rear side 5 of the distributor block 1, is termed the depth direction 12, whereas the direction extending perpendicularly thereto and parallel to the component mounting areas 8 shall be termed the width direction 13.

Each component mounting area 8 is suitable for the detachable mounting of a main valve 14. In order to make the drawing more straightforward only one valve is depicted in FIG. 1. In the case of the main valve 14 it is a question of multiway valve, as for instance a three-way valve or, as in the working embodiment, a five-way valve. The design of such main valves 14 is familiar to those in the art so that no details have to be provided thereof. Normally the main valve 14 will comprise a spool able to be reciprocated in the longitudinal direction 15 and which is mounted in a suitable recess, into which lateral ducts open, which at their other ends open at the lower side of the valve, where they communicate with the openings of the branch ducts 7. Further such valve ducts communicate with power ducts 16 extending in the distributor block 1 and which for their part lead to a side surface 17 of the distributor block 1, where fluid ducts running to loads are able to be connected.

The main valve 14 has for instance a rectangular configuration and is attached to the associated component mounting area 8 so that its longitudinal direction 15 coincides with the width direction 13. In order to operate the main valve 14, that is to say in order to move its valve spool into the required switching position, the main valve 14 of the illustrated working embodiment is provided with two electrical control units 22 and 23. For instance on each end surface of the main valve 14 one of these control units 22 and 23 is mounted. It is in this manner that direct attachment of the control units on the distributor block 1 is made unnecessary since they are held exclusively by the main valve 14.

Therefore the first control unit 22 is arranged adjacent to and over the above mentioned first lateral surface 17 or area of the distributor block 1. The first control unit 22 may extend in the width direction 13 past the distributor block 1 as shown in FIG. 2. The second control unit 23 is consequently associated with the opposite second lateral surface 18, it preferably being set back in relation to it as shown in FIG. 2 as well.

The two electrical control units 22 and 23 are pilot valves, that is to say solenoid valves which contain an electromagnet. Such pilot valves are also part of the prior art so that a detailed description of the design thereof and of the cooperation with the main valve 14 is not necessary either. The important point is that such control units 22 and 23 are electrically operated, the necessary electrical signals being supplied from the above mentioned signal distributor 3.

The said signal distributor 3 extends like the fluid distributor 2 in the depth direction 12 of the distributor block 1 and opens like the fluid ducts 6 with opposite connection sides 24 and 25 on the front side 4 and the rear side 5 of the distributor block 1. For instance the signal distributor 3 may comprise a electrical or, respectively, electronic printed circuit board 26 diagrammatically indicated in FIG. 3, which extends through the distributor block 1 in the depth direction 12 and is arranged in a suitable receiving opening 27 extending through the latter. The edge sides, facing the front side 4 and the rear side 5, of the printed circuit board 26 constitute the above mentioned connection sides 24 and 25 and each bear a multiple plug connector 28 and 28', whose plug contacts 32 are aligned in the depth direction 12. The plug contacts 32 of the two multiple plug connectors 28 and 28' are connected with each other via electrical conductors, which are not illustrated in detail, of the printed circuit board 26 so that electrical signals may be sent therethrough. Selected ones of the said electrical conductors are furthermore fitted with plug connectors, which constitute a second set 33 of electrical plug connectors. For each valve unit 34 composed of a main valve 14 and at least one control unit 22 and 23 such a second set 33 of electrical plug connectors is provided, for which reason the distributor block 1, given by way of example, comprises two such second sets 33 of plug connectors.

Each respective second set 33 of plug connectors is for instance attached to the top side of the horizontally fitted printed circuit board 26. The printed circuit board 26 therefore extends preferably in a plane defined by the depth direction 12 and the width direction 13. Openings made downwards in the distributor block are opposite a respective second set 33 of plug connectors thereover and render the same accessible for the connection from above of conductors extending on to other parts of the system.

At this point it is to be noted that instead of printed circuit boards with their known convenience it is furthermore possible to have separate wiring connections, the said second sets of electrical plug connectors 33 then having to be secured in some other way, for example directly on the distributor block 1 itself. It would also be possible to design the fluid distributor 2 and the signal distributor 3 as two separate components, for instance in the form of one fluid distributor block and a signal distributor block, the two blocks being preferably able to be attached to one another. The blocks may be plate-like or rail-like in their configuration.

It is in this case important that the second set 33 of plug connectors is directed upwards in the direction 35 of the height of the distributor block 1. It is then possible to plug in a complementary set of plug connectors without any difficulty from above in a detachable manner.

The second control unit 23 associated with the second side surface 18 extends in the working embodiment partly past the signal distributor 3. However the associated second set 33 of plug connectors is located, as seen in plan view from above, adjacent to the valve unit 34 and preferably directly adjacent to the second control unit 23.

The second control unit 23 bears an upwardly facing first set 37 of electrical plug connectors, and on the first control unit 22 there is a corresponding, also upwardly directed fifth set 38 of electrical plug connectors. Both sets 37 and 38 are arranged on an upwardly turned connection side 39 of the respective control unit 22 and 23. Furthermore the said two sets 37 and 38 of electrical plug connectors are higher up than the second set 33 provided on the signal distributor 3, of electrical plug connector and among themselves are preferably at the same level.

For the electrical connection of the first and fifth sets 37 and 38; provided on the two control units 22 and 23, of plug connectors with the second set 33, provided on the signal distributor 3, of electrical plug connectors there is an intermediate part, which is constituted by a plug-like connection bridge 40. The latter has a geometry similar to that of a letter L with two L-like limbs or legs 43 and 44 at a right angle to one another. The first L-like limb 43 extends in the same direction as the longitudinal axis 15 of the associated main valve 14 and overlaps both this main valve 14 as well as the control units present, in the present case, two control units 22 and 23. The first L limb 43 extends therefore over the valve unit 34 and more particularly along its entire length so that it practically constitutes a cover.

The second L limb 44 extends from the first L limb 43 downwards towards the signal distributor 3. It flanks the valve unit 34 at the end side provided with the second control unit 23 and extends past this second control unit 23 in the vertical direction 36. Aligned in the vertical direction 36 with the second L limbs 44 there is the second set 33 of electrical plug connectors of the signal distributor 3. The outer surface 42 of the second L limb 44 is preferably in line with the second lateral surface 18 of distributor block 1.

Complementary fourth (45), third (46) and sixth (47) sets of electrical plug connectors are arranged on the connection bridge 40 for providing a detachable plug connection with the already mentioned second, first and fifth sets 33, 37 and 38 of plug connectors. All these above mentioned sets 45, 46 and 47 of plug connectors are directed downwards towards the fluid distributor 2 and, respectively, the signal distributor 3. Moreover they are so arranged that on connection of the connection bridge 40 they are plugged with the firstly mentioned three sets 33, 37 and 38 of plug connectors.

The fourth set 45 of plug connectors is arranged for instance on the end side 48 which is opposite to the first L limb 43 and is directed downwards of the second L limb 44. The third (46) and sixth (47) sets of plug connectors are arranged with a spacing apart in the longitudinal direction of the limb, for instance on the downwardly directed inner side 49 of the first L limb 43. After the L-like connection bridge 40 has been plugged in position, firstly the fourth (45) and second (33), secondly the third (46) and first (37) and thirdly the sixth (47) and fifth (38) sets of plug connectors are detachably electrically connected with one another by being plugged together.

Electrical leads 53 of the connection bridge 40 constitute internally the electrical connection between each of the third (46) and sixth (47) sets of plug connectors with the fourth set 45 of plug connector. It is in this manner that, the two control units 22 and 23 are electrically connected for the transmission of signals via the connection bridge 40 with the signal distributor 3.

Should the valve unit 34 have merely one control unit, which then preferably assumes the position of the second control unit 23, the length of the first L limb 43 may be reduced. It is then in principle sufficient for the first L limb 43 to extend over the respective control unit 23. However for mounting purposes or for accommodating additional components it can be expedient if the first L limb 43 also extends at least partly over the main valve 14 in this case.

Preferably the connection bridge 40 has a housing 54 establishing the L-like configuration. It comprises all electrical leads 53 running between the plug connector sets 45, 46 and 47. The same are therefore screened off from the surroundings and protected against the environment. This renders possible use of the valve arrangement even in situations with substantial contamination of the environment.

The electrical leads 53 extending in that housing section 55, which corresponds to the first L limb 43, are for instance components of a printed circuit board 57 accommodated fin this housing section 55. The associated third and sixth sets 46 and 47 of plug connectors are in this case directly borne by this printed circuit board 57. They are preferably mounted on the lower side of the horizontally installed printed circuit board 57.

On the printed circuit board 57 it is possible to arrange electrical and/or electronic circuits compactly without any difficulty. Owing to the encapsulation within the housing the same are then effectively protected. It is possible to Integrate circuits here which on excitation of a respective control units 22 and 23 light up an indicating means 58, with which the printed circuit board 57 is fitted as well. This is for instance the case here and the indicating means are constituted by so-called LED's and on the housing section 55 there are transparent parts 59*a* so that the light indicating 58 may be seen from the outside.

A further example for an electronic circuit would be one for protection against overvoltages. It is certainly possible to employ printed circuits.

The housing 54 is preferably made up in more than one part, the parts of the housing present preferably being detachably connected together with each other in order if required to open the same, for instance when replacement of the printed circuit board therein 57 is necessary. In the illustrated working embodiment the housing section 55 corresponding to the first L limb is arranged longitudinally with the formation of a removable, upper housing cover 59. After removal of the housing cover 59 the inserted printed circuit board 57 will be visible and can be removed without any problems.

Apart from the removable housing 54 the housing 54 is preferably made integrally and preferably consists of synthetic resin. That housing section 56 which corresponds to the second L limb 44, has in the present case the configuration of a sleeve-like hollow body. The electrical leads 53 arranged in the same are in the present working embodiment constituted by pin-like wires 60, which extend in the longitudinal direction of the second L limb 44 and have their upper end secured to the printed circuit board 57. The end parts 61 remote from the first L limb 43, of the pin-like wires 60 constitute, in the present case, directly the fourth set 45 of plug connectors, which is able to be inserted into the second set 33 of plug connectors. After removal of the housing cover 59 it is possible to insert and, respectively, remove, the component consisting of the printed circuit board 57 and the wires 60 from above into the housing 54.

The housing section 56 extends downwards as far as the distributor block 1, on which it may be mounted. It is in this manner that the entry of foreign matter is effectively prevented.

It is furthermore an advantage if the inner side 49 of the housing section 55 corresponding to the first L limb 43, is shaped like the top side 62 of the valve unit 34. As a result cavities are avoided in which foreign matter might collect. In this case it is convenient if the housing section 55 is directly mounted on the top side 62 with the result that there is a stable arrangement. To the extent that it may be necessary to the secure the connection bridge 40 additionally apart from the above mentioned plug connections, it is furthermore possible to attach the part 63, which is above the main valve 14, of the housing 54 detachably with the said main valve 14.

An attachment of the above mentioned type is present in the working embodiment in which studs 64 extend upwards from the top side of the main valve 14, which fit into recesses 65 in the housing section 55 and possess an internal screw thread. In the prolongation of the respective female screw thread the housing section 55 is provided with through openings 66, through which the holding screws 167 fit and may be screwed into the female screw thread. The studs 64 are preferably components of clamping screws, with which the main valve 14 is secured to the valve block 1.

The width of the connection bridge 40 as measured in the depth direction 12 is preferably equal to that of the valve unit 34 so that there is a compact design.

The plug connectors of the individual sets of plug connectors may be designed in any desired manner. Normally the plug connectors of the respective one of two cooperating sets are designed in the form of pins, whereas the associated with plug connectors constitute receiving means into which the pin-like plug connectors are able to be inserted.

The supply of the control units 22 and 23 with control signals is performed in the working embodiment since a control device, not illustrated in detail, is connected on the multi-plug connector 28, which is associated with the front side 4. In FIG. 3 a multiple plug in shown in broken lines at 267 for connection with other parts of the system. The control signals may be transmitted 1:1, essentially each plug connector of the control units 22 and 23 having its own associated electrical lead of the signal distributor 3. However it is possible furthermore to have a particularly convenient and space saving so-called fieldbus control means.

The unit illustrated in FIG. 1 of a valve arrangement is so designed that it may be arrayed with other similar valve arrangements in the depth direction 12 so that larger units will be obtained shown in broken lines in FIG. 3. Such larger units are termed valve islands or valve terminals. In the case of such an array the signal distributor 3 is automatically extended since mutually facing multiple plug connectors 28 and 28' of adjacent units are fitted into each other. Furthermore the fluid ducts 6 are in this case correspondingly extended. It is naturally necessary to provide suitable terminating and/or connecting parts on the respective end side of the component so produced.

It is furthermore to be noted that the control units 22 and 23 provided in the working embodiment are fitted with a so-called manual auxiliary actuating device. The same renders it possible, for instance for testing purposes or in the case of failure of the power supply to actuate the respective control unit manually. One component of this device is an actuating plunger 67 which extends out of the respective control unit to a higher level than the main valve 14 on the inner side facing the same, of the control units. By depressing the actuating plunger 67 into the associated control unit 22 and 23 the latter is manually operated.

Owing to the connection bridge 40 spanning the valve unit 34 the actuating plungers 67 are not readily accessible. Therefore for each control unit 22 and 23 on the housing section 55 a pivotally arranged actuating lever 71 is provided which extends through a slot 72 in the housing in the vertical direction 36. An operating part 73 thereof extends upwards over the housing section 55. Its downwardly directed actuating part 74 extends as far as the actuating plunger 67, to which it is opposite. By means of a web 75 of material the actuating lever 71 is molded integrally within the housing slot 72 on the housing part 63 arranged underneath the housing cover 59. This web 75 of material constitutes a point of flexure which renders possible a pivotal movement when the operating part 73 is pressed to the side. As part of this pivotal motion the actuating part 74, which is underneath the web 75 of material, presses against the actuating plunger 67 and then operates the associated control unit.

We claim:

1. A valve arrangement comprising a fluid distributor and a signal distributor arranged adjacent to the fluid distributor for distributing electrical signals, at least one main valve arranged on a component mounting area of the fluid distributor which communicates with fluid ducts of the fluid distributor, and at least one electrically operated control unit arranged adjacent to the main valve, said control unit having a first set of electrical plug connectors electrically connected to an upwardly directed second set of electrical plug connectors of the signal distributor through an L-shaped intermediate part, the intermediate part forming a connection bridge with a first leg having a third set of electrical plug connectors associated with the first leg and a second leg extending from an end of the first leg and having a fourth set of electrical plug connectors associated with the second leg, the third and fourth sets of plug connectors being electrically connected with each other, the control unit being aligned so that the first set of electrical plug connectors is directed upwards and is at a higher level than the second set of electrical plug connectors of the signal distributor, the first leg extending over the control unit with the third set of plug connectors being in plugged connection with the first set of plug connectors of the control unit and the second leg extending past the control unit toward the signal distributor with the fourth set of plug connectors being in plugged connection with the second set of plug connectors, the second set of plugged connectors being arranged clear of the component mounting area of the fluid distributor.

2. The valve arrangement as claimed in claim 1, wherein the control unit is arranged adjacent to an end surface of the main valve facing the signal distributor.

3. The valve arrangement as claimed in claim 1, wherein the first leg extends in the same direction as a longitudinal axis of the main valve.

4. The valve arrangement as claimed in claim 3, wherein at least a portion of the first leg extends over the main valve.

5. The valve arrangement as claimed in claim 1, comprising a second control unit associated with the main valve, said second control unit having a fifth set of electrical plug connectors which is directed upwards, the first leg extending simultaneously over both control units and having a downwardly directed sixth set of electrical plug connectors which is in plugged connection with the fifth set of plug connectors of the second control unit and is connected via electrical leads of the connection bridge with the fourth set of plug connectors.

6. The valve arrangement as claimed in claim 5, wherein the two control units are arranged adjacent to mutually opposite end surfaces of the main valve, the first leg bridging over the main valve along a longitudinal axis thereof and the second leg flanking the first control unit along an end surface of the first control unit.

7. The valve arrangement as claimed in claim 5, wherein the third set and the sixth set of plug connectors are arranged on a downwardly facing inner side of the first leg.

8. The valve arrangement as claimed in claim 1, wherein the fourth set of plug connectors is arranged at an end surface of the second leg.

9. The valve arrangement as claimed in claim 1, wherein the connection bridge has a housing in which electrical leads extending between the plug connector sets of the connection bridge are accommodated.

10. The valve arrangement as claimed in claim 9, wherein the electrical leads extending in a housing section corresponding to the first leg are at least partly a component of a printed circuit board received in the housing section, which printed circuit board bears the sets of plug connectors.

11. The valve arrangement as claimed in claim 10, wherein the printed circuit board bears at least one electrical or electronic circuit.

12. The valve arrangement as claimed in claim 9, wherein the electrical leads extending in a housing section corresponding to the second leg are pin-like wires, the pin-like wires having an end part remote from the first leg which constitutes the fourth set of plug connectors.

13. The valve arrangement as claimed in claim 9, wherein the housing section corresponding to the first leg includes a removable upper housing cover.

14. The valve arrangement as claimed in claim 1, wherein the fluid distributor and the signal distributor are integrated in one distributor block which is arrayed with other similar distributor blocks, the signal distributor comprising a printed circuit board, a top side of the circuit board bearing the second set of plug connectors, and multiple plug connectors positioned in the direction of the arrayed distributor blocks so that mutually facing multiple plug connectors of adjacent ones of the arrayed distributor blocks constitute a continuous electrical signal connection.

15. The valve arrangement as claimed in claim 10, comprising an actuating lever arranged on the housing section corresponding to the first leg of the connection bridge, an upwardly directed actuating part of the lever being positioned opposite to an actuating plunger of a manual auxiliary actuating device of the control unit.

16. The valve arrangement as claimed in claim 15, wherein the actuating lever is molded integrally on the housing by flexible means which facilitates a pivotal movement of the actuating lever.

17. The valve arrangement as claimed in claim 11, wherein the at least one electrical or electronic circuit board drives at least one optical indicating means.

18. The valve arrangement as claimed in claim 11, wherein the at least one electrical or electronic circuit board protects against overvoltages.

19. The valve arrangement as claimed in claim 14, wherein the arrayed distributor blocks form a plate-like or rail-like body.

* * * * *